Oct. 11, 1960  J. V. SMITH  2,955,924
APPARATUS FOR CARRYING OUT HIGH SPEED STIRRED REACTIONS
Filed May 23, 1955
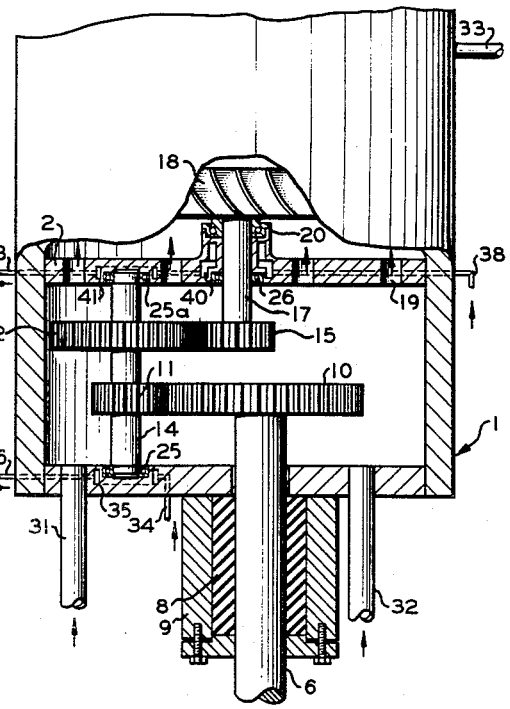
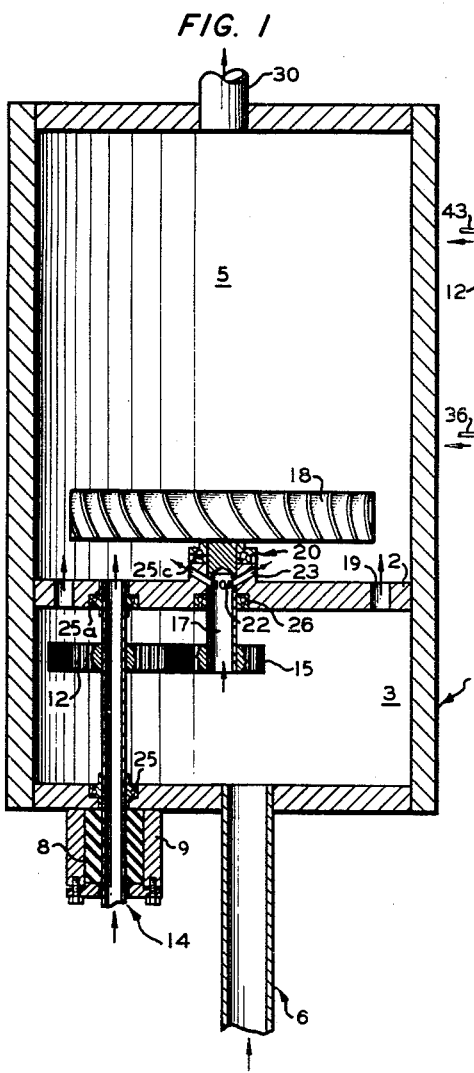
INVENTOR.
J.V. SMITH
BY Hudson & Young
ATTORNEYS

United States Patent Office 2,955,924
Patented Oct. 11, 1960

2,955,924

APPARATUS FOR CARRYING OUT HIGH SPEED STIRRED REACTIONS

James V. Smith, Bartlesville, Okla., assignor to Phillips Petroleum Company, a corporation of Delaware Filed May 23, 1955, Ser. No. 510,187

9 Claims. (Cl. 23—285)

The present invention is directed to a means for driving an agitator at high speed with a low speed drive shaft immersed in the liquid to be agitated.

Mixing with its consequent blending or dispersion is often necessary to cause or hasten a reaction. Furthermore, by thorough mixing, undesirable side reactions are often prevented by eliminating localized overheating or excesses of reagents. Some examples of reactions which are hastened by mixing or stirring are the hydrogenation of oils, the hydrolysis of starches to sugars, and the liquid phase oxidation of hydrocarbons, e.g., cyclohexane. Many of these reactions are also accelerated by increased pressure. The problem of providing a packing gland which will withstand high pressures and high speed shaft rotation is one of the difficulties encountered in promoting high pressure reactions by high speed stirring. Sealant materials which provide satisfactory sealing against high pressures will not withstand the heat generated by the friction of high speed shaft rotation, and consequently, seize or "freeze up." Conversely, packing materials which will withstand a relatively high rotation speed require a small amount of leakage to cool the packing material, thus these materials are quite ineffective in sealing high pressure chambers.

It has now been discovered that reactions involving at least one liquid reactant which require high speed stirring, and particularly those which are effected under high pressure, may be carried out by using an apparatus which comprises a low speed stirrer drive or motor, a gear train within the reactor itself for stepping up the low speed rotation to high speed rotation to drive the stirrer impeller, and feed inlets to the reactor located so that incoming reactant feed cools and lubricates the gear train. Where the temperature of the feedstock is too high to cool the gear train a coolant is circulated through the latter to effect heat exchange.

The principal object of the invention is to provide means for stirring a liquid at high speeds but employing a packing means adapted for low speed drive shafts. A further object is to provide a reactor adapted for high pressures which employs a high speed stirrer driven by a low speed drive shaft. A more specific object is to provide an agitator which can be driven at high speeds without encountering the packing gland failure normally encountered in so doing.

Referring to Figure 1, reactor vessel 1 is separated by a partition 2 into a lower or gear box portion 3 and an upper or stirring zone 5. Hollow drive shaft 14 enters the base of reactor 1 through packing gland 8 in packing housing 9. Pinion 12 is attached to shaft 14 and rotates therewith, driving gear 15 mounted on hollow impeller shaft 17, thereby rotating impeller 18. Shaft 17 is seated in a tapered roller bearing 20 and is hollow from its lower end up to a point adjacent bearing 20. A plurality of annular orifices 22 in shaft 17 communicate with ports 23 adjacent the base of bearing 20. Shaft 14 is journaled in ball bearings 25, 25a and shaft 17 is journaled in ball bearing 26, thereby reducing friction at these points.

The entire transmission system is cooled by admitting liquid feedstock through shaft 14 into stirring zone 5 and through conduit 6 into gear box 3, the feed being forced from the latter zone into the upper portion through perforations 19 in partition 2 and through shaft 17, orifices 22, and ports 23. This provides internal cooling of the impeller shaft 17 and its bearing surface. The stirred product is discharged from the top of vessel 1 through line 30. In an oxidation reaction, for example, the liquid feedstock could be admitted through element 6 to effect cooling of the bearings and oxidizing gas admitted directly through shaft 14 to stirring zone 5.

Figure 2 is a modification of the system shown in Figure 1. In this version packing gland 8 in packing housing 9 surrounds element 6 which is the drive shaft of a slow speed motor. Pinion 10 on shaft 6 rotates therewith, driving a gear train comprising gears 11 and 12 mounted on shaft 14, and gear 15 mounted on impeller shaft 17. Shaft 14 is seated in bearings 25, 25a, and shaft 17 in bearings 20, 26. An external coolant is admitted to the bearings 20, 25, 25a, and 26 as an alternative to circulating the reactants through the shafts as in Figure 1. Liquid reactants are admitted to the base of the reactor through conduits 31, 32 and forced into the upper or stirring section entirely through orifices 19 in partition 2. Coolant is admitted through line 34 to the base of reactor 1, circulated through internal ring 35 surrounding bearing 25, and discharged at 36. Coolant is likewise admitted through line 38 to the interior of partition 2, circulates through rings 40, 41 and is discharged from the system at 43. The circulation of coolant through vertically elongated ring 40 serves to simultaneously cool both bearings 26 and 20; the passage of coolant through ring 41 likewise cools bearing 25a. In the case of an oxidizing reaction the oxidizing agent is preferably admitted to the stirring zone through line 33.

It is evident that by selecting proper gear ratios the speed of impeller 18 can be made many times the speed of the drive shaft. In this way very rapid stirring can be effected by a comparatively slow rotation of the drive shaft thus avoiding the difficulties encountered in using a packing gland around a shaft rotating at high speed.

The apparatus of this invention makes possible high speed stirring of high pressure reaction mixtures without the difficulty normally encountered with packing glands which surround high speed shafts. Packing materials such as duck rubber, an effective packing for high pressures, may be used in the packing gland on the low speed shaft of this invention without danger of seizure due to high temperatures caused by the friction of the shaft. A further advantage of the apparatus of this invention is that by changing the gear ratios any desired impeller speed can be provided while using a constant speed motor.

The foregoing illustration serves to represent a preferred embodiment of this invention but other embodiments such as means for supporting the gear train and stirrer impeller within the reactor should be obvious to others skilled in the art. While the description given above shows the stirrer drive entering the bottom of the reactor, the drive can be positioned on either side or on the top of the reactor so long as the packing gland is exposed only to liquid, since packing glands are ineffective to stop gas leaks. Hence, if the drive shaft enters the side of the reactor it should be below liquid level; if it enters the top of a reactor the latter should be operating liquid full if the reaction is being carried out at a pressure greater than atmospheric.

I claim:

1. Apparatus suitable for carrying out high speed stirred reactions comprising a closed pressurizable vessel having an inlet and an outlet, a partition within said vessel separating said inlet and outlet and forming a feed zone containing said inlet and a reaction zone containing said outlet, said partition having a passageway communicating said zones, an impeller in said reaction zone, a rotatable shaft carrying said impeller and extending through said partition into said feed zone, a drive shaft extending through the reactor wall into said feed zone, and a speed-multiplying gear train within said feed zone linking said drive shaft to the impeller shaft so that low rotational speed of the drive shaft imparts high rotational speed to the impeller, said inlet being such that the incoming feed submerges said gear train.

2. An apparatus suitable for carrying out high speed stirred reactions comprising a closed pressurizable vessel, a partitioning member within said vessel forming a reaction zone and a feed zone, an impeller element within said reaction zone, a shaft affixed to said impeller element and extending into said feed zone, a packing gland in the wall of said vessel, a drive shaft extending from outside said vessel through said packing gland into said feed zone, a gear train within said feed zone linking said drive shaft and said impeller shaft with a gear ratio such that low speed rotation of said drive shaft imparts high speed rotation to said impeller shaft, liquid feed inlet means in said vessel and said partitioning member such that liquid feed must pass through said feed zone to said reaction zone and thereby submerges said gear train, outlet means in said vessel for removing reaction product and unreacted feed from said reaction zone, and separate reactant feed inlet means connected directly to said reaction zone thereby enabling chemical reaction to be confined to said reaction zone.

3. Apparatus of claim 1 wherein the drive shaft is packed with a packing designed for use with a low speed shaft.

4. Apparatus of claim 1 wherein the drive and impeller shafts are hollow and designed to permit injection and transmission of liquid feedstock therethrough.

5. In combination a closed vessel, an impeller mounted on an impeller shaft within said vessel, a drive shaft extending into said vessel and journaled in the wall thereof, a gear train within the vessel driven by the drive shaft and driving the impeller shaft, the gear ratio of said gear train being such as to drive the impeller shaft at a higher speed than the drive shaft, a support element within said vessel in which the impeller shaft is journaled, a packing gland through which the drive shaft enters the vessel, said gland being designed for use with a slow speed shaft, feed inlet means located so that the incoming feed submerges and lubricates the gear train and means for internally cooling the bearings of said shafts.

6. Apparatus of claim 5 wherein the means for cooling comprises ducts within the several shafts designed to permit the flow of liquid reactants therethrough at a temperature sufficiently low to effect cooling of the bearing surface thereof.

7. Apparatus of claim 5 wherein the cooling means comprises ducts extending through the interior of those portions of the support element and vessel wall which house the shaft bearings, said conduits encircling the bearings so as to effect indirect heat exchange therewith, and means for admitting a coolant to and discharging coolant from said ducts.

8. An apparatus suitable for carrying out high speed stirred reactions comprising a closed pressurizable vessel, a partitioning member within said vessel forming a reaction zone and a feed zone, an impeller element within said reaction zone, a shaft affixed to said impeller element and extending into said feed zone, a packing gland in the wall of said vessel, a drive shaft extending from outside said vessel through said packing gland into said feed zone, a gear train within said feed zone linking said drive shaft and said impeller shaft with a gear ratio such that low speed rotation of said drive shaft imparts high speed rotation to said impeller shaft, liquid feed inlet means in said feed zone of said vessel and in said partitioning member such that liquid feed must pass through said feed zone to said reaction zone and thereby submerge said gear train, and outlet means in said reaction zone of said vessel for removing reaction product and unreacted feed from said reaction zone.

9. An apparatus according to claim 8 wherein said packing gland is positioned below the normal liquid level in said vessel.

References Cited in the file of this patent

UNITED STATES PATENTS

| | | |
|---|---|---|
| 394,056 | Cameron | Dec. 4, 1888 |
| 1,454,610 | Wolf | May 8, 1923 |
| 1,514,118 | Wright | Nov. 4, 1924 |
| 1,932,931 | Greer et al. | Oct. 31, 1931 |
| 2,028,595 | Flegel | Jan. 21, 1936 |
| 2,352,206 | Kendall | June 27, 1944 |
| 2,399,988 | Cowles | May 7, 1946 |
| 2,592,709 | Kinnaird | Apr. 15, 1952 |
| 2,639,901 | Teale | May 26, 1953 |
| 2,706,667 | Kaczor | Apr. 19, 1955 |
| 2,731,173 | Harrigan | Jan. 17, 1956 |